Patented May 27, 1941

2,243,437

UNITED STATES PATENT OFFICE 2,243,437

SULPHONIC ACID AMIDES AND A PROCESS OF PREPARING THEM

Ludwig Orthner and Gerhard Balle, Frankfort-on-the-Main, Karl Horst, Hofheim in Taunus, and Heinz Schild, Frankfort-on-the-Main, Germany, assignors, by mesne assignments, to General Aniline & Film Corporation, New York, N. Y., a corporation of Delaware No Drawing. Application July 29, 1939, Serial No. 287,246. In Germany August 8, 1938

4 Claims. (Cl. 260—513)

The present invention relates to sulphonic acid amides and it particularly relates to sulphonic acid amides substituted in the amido group by organic radicals containing water-solubilizing groups, such as carboxylic acid or sulphonic acid groups, and to a process of preparing such compounds.

We have found that valuable capillary-active substances may be obtained by causing sulphamides the organic radical of which consists of an aliphatic hydrocarbon radical with at least 4 carbon atoms or contains such a radical, to react with formaldehyde or with substances yielding formaldehyde and with the salts of amino-carboxylic acids or amino-sulphonic acids.

As sulphamides there may, for instance, be used: butylsulphamide, octylsulphamide, dodecylsulphamide, octadecylsulphamide, butylbenzene-sulphamide, octylbenzene-sulphamide, N-lauroyl-1-aminobenzene-3-sulphamide, dichloroctadecylsulphamide, 1-dodecyloxybenzene-4-sulphamide. The sulphamide group may thus be linked to an organic hydrocarbon radical which may, if necessary, be substituted or may be interrupted by heteroatoms or heteroatom-groups.

There may further be mentioned the sulphamides obtainable by reaction of the sulphochlorides easily prepared as described in U. S. Patent No. Re. 20,968 from paraffinic, preferably straight-chained hydrocarbons by simultaneous action of chlorine and sulphur dioxide with ammonia.

The group rendering the product soluble in water which becomes linked to the nitrogen atom of the amide by means of the methylene group may be introduced into the sulphamides by causing formaldehyde or a substance yielding formaldehyde and a salt of an amino-carboxylic- or sulphonic acid to react with the sulphamide.

As amino-carboxylic acids or amino-sulphonic acids there may, for instance, be used: glycocoll, alanine, sarcosine, butylglycocoll, m-amino-benzoic acid, aminomethane-sulphonic acid, taurine, methyltaurine, methylamino-oxypropane-sulphonic acid, sulphanilic acid, metanilic acid or beta-aminoethoxyethane-sulphonic acid. With N-lauroyl-1-aminobenzene-3-sulphamide and sarcosine, for instance, the reaction probably takes the following course:

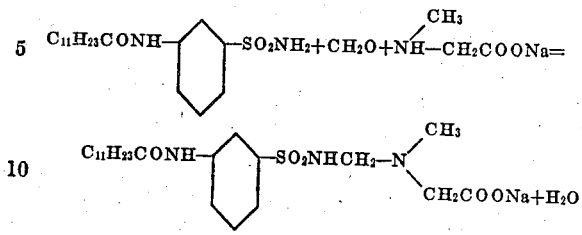

A sulphamide, for instance the octadecylsulphamide may be rendered water-soluble by means of an amino-sulphonic acid, for instance, methyltaurine, as in the following equation:

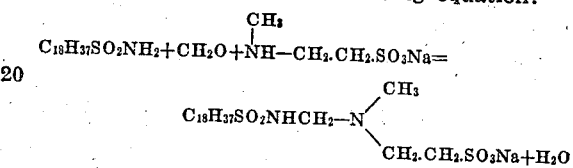

By the present process there are obtained the salts of compounds of the general formula:

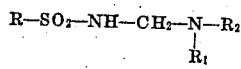

wherein R means an organic radical having at least 4 carbon atoms in a chain, $R_1$ means hydrogen or a hydrocarbon radical, and $R_2$ stands for an organic radical containing an acid group selected from carboxylic acid and sulphonic acid groups.

The reactions are performed by mixing the components, preferably at a raised temperature. An addition of a solvent may also be advantageous.

By rendering the above-named sulphamides water-soluble with the aid of formaldehyde and bisulphite there may likewise be obtained products having capillary-active properties. With dodecylsulphamide, for instance, this reaction occurs according to the following equation:

$C_{12}H_{25}SO_2NH_2 + NaHSO_3 + CH_2O =$

The new capillary-active products have, depending on the molecular weight of the sulphamides used for their preparation, a good wetting or dispersing or emulsifying or cleansing action and on account of these properties may be used in various ways for the treatment of materials of all sorts. They may be used either alone or mixed with each other or also in admixture with other capillary-active substances or together with water-softening agents and bleaching agents.

The following examples serve to illustrate the invention, but they are not intended to limit it thereto; the parts are by weight:

1. 333 parts of octadecylsulphamide are mixed with 740 parts of a solution of 15 per cent strength of sodium methylaminoacetate (sarcosine-sodium salt) and to this mixture 40 parts of para-formaldehyde are added. The whole is boiled for 5 to 6 hours under reflux and the mass is evaporated to dryness. After extraction with acetone, the product is soluble in boiling water to a clear solution.

2. 297 parts of a sulphamide mixture prepared by simultaneously causing chlorine and $SO_2$ to act upon a mixture of aliphatic hydrocarbons having the average molecular weight of 218 and then causing the sulphochloride mixture obtained to react with ammonia, are mixed with 40 parts of para-formaldehyde and 166 parts of the sodium salt of alpha-aminopropionic acid. The mixture is heated to 100° C., while well stirring, until a test portion has become water-soluble. A solid pulverizable mass is obtained which is soluble in water and yields strongly frothing solutions.

3. 269 parts of octylbenzene-sulphamide, 240 parts of the sodium salt of methyltaurine and 40 parts of para-formaldehyde are mixed and the mixture is heated for about ½ to 1 hour, while stirring, to 100° C. The product thus obtained is water-soluble. Its solutions have a very good cleansing effect.

4. 221 parts of a sulphamide mixture prepared by simultaneously causing chlorine and $SO_2$ to act upon a benzine fraction of the average molecular weight of 122 and treating the sulphochlorides obtained with ammonia, are mixed with a solution of 150 parts of the sodium salt of taurine in 200 parts of water and 130 parts of formaldehyde (of 30 per cent strength) and then boiled for several hours under reflux. After the whole has dissolved to a clear solution it is evaporated to dryness under reduced pressure. The product thus obtained is soluble in water, its solutions show an extraordinarily strong frothing action.

5. 354 parts of lauroyl-aminobenzene-sulphamide are mixed with 240 parts of the sodium salt of methyl-taurine and 42 parts of para-formaldehyde. The mixture obtained is heated for one hour at 100° C., until a test portion has become soluble in hot water. An almost colorless product is obtained.

6. 297 parts of the sulphamide mixture described in Example 2, 270 parts of the sodium salt of metanilic acid (the sodium salt of m-aminobenzene-sulphonic acid) and 42 parts of paraformaldehyde are heated together for about 1 to 2 hours to 100° C.–110° C. A mixture of sodium salts is obtained which is soluble in hot water.

7. 213 parts of butylbenzene-sulphamide dissolved in 600 parts of methanol are mixed with a solution of 168 parts of the sodium salt of sarcosine in 200 parts of water and with 200 parts of formaldehyde (of 30 per cent strength). The mixture is boiled, under reflux, for about 15 hours and then evaporated to dryness under reduced pressure. The product obtained is soluble in water.

We claim:

1. The process which comprises causing sulphonic acid amides containing an organic radical having at least 4 carbon atoms in a chain prepared by condensing ammonia with a product obtained by simultaneous action of chlorine and sulphur dioxide upon saturated aliphatic hydrocarbons to react with a member of the group of formaldehyde and compounds yielding formaldehyde and with a salt of the group consisting of amino-carboxylic and amino-sulphonic acid salts.

2. The process which comprises causing a sulphonic acid amide obtained by the action of $SO_2$ and chlorine upon a benzine mixture having the average molecular weight of 122 and subsequent amidation to react with formaldehyde and the sodium salt of amino-ethane-sulphonic acid.

3. As new products the salts of compounds of the general formula:

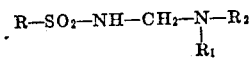

wherein R—$SO_2$ is the radical of a sulphonic acid chloride obtained by simultaneous action of chlorine and sulphur dioxide upon a saturated aliphatic hydrocarbon having at least 4 carbon atoms in a chain, $R_1$ means a member of the group consisting of hydrogen and hydrocarbon radicals and $R_2$ stands for a radical selected from the class consisting of alkylene- and arylene sulphonic- and carboxylic acid radicals.

4. As a new product the compound of the formula:

wherein $R_1.SO_2$ is the radical of a sulphonic acid chloride obtained by simultaneous action of $SO_2$ and chlorine upon a benzine mixture having the average molecular weight of 122.

LUDWIG ORTHNER.
GERHARD BALLE.
KARL HORST.
HEINZ SCHILD.